(12) United States Patent
Hirai et al.

(10) Patent No.: US 10,019,233 B2
(45) Date of Patent: Jul. 10, 2018

(54) SEMICONDUCTOR DEVICE, POSITION DETECTION DEVICE, AND CONTROL METHOD OF SEMICONDUCTOR DEVICE

(71) Applicant: RENESAS ELECTRONICS CORPORATION, Tokyo (JP)

(72) Inventors: Masato Hirai, Tokyo (JP); Yuki Higuchi, Tokyo (JP); Takeshi Kuwano, Tokyo (JP); Kosuke Fuwa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 4 days.

(21) Appl. No.: 15/402,671

(22) Filed: Jan. 10, 2017

(65) Prior Publication Data

US 2017/0199725 A1 Jul. 13, 2017

(30) Foreign Application Priority Data

Jan. 12, 2016 (JP) ................................. 2016-003455

(51) Int. Cl.
*G06F 7/48* (2006.01)
*G06F 7/50* (2006.01)
*G06F 7/523* (2006.01)
*G06F 1/32* (2006.01)

(52) U.S. Cl.
CPC ................ *G06F 7/50* (2013.01); *G06F 7/523* (2013.01); *G06F 1/3203* (2013.01)

(58) Field of Classification Search
CPC .................................. G06F 7/50; G06F 7/523
USPC ....................................................... 708/190
See application file for complete search history.

(56) References Cited

U.S. PATENT DOCUMENTS

| | | | |
|---|---|---|---|
| 5,466,896 A | 11/1995 | Murakami et al. | |
| 5,619,431 A * | 4/1997 | Oda ........................ | G06F 3/046 |
| | | | 702/150 |
| 6,810,351 B2 | 10/2004 | Katsurahira | |
| 7,529,153 B2 * | 5/2009 | Watanabe .............. | G01B 17/00 |
| | | | 367/124 |

FOREIGN PATENT DOCUMENTS

| | | |
|---|---|---|
| JP | 2583500 B2 | 2/1997 |
| JP | 2635082 B2 | 7/1997 |
| JP | 2971488 B2 | 11/1999 |
| JP | 2003-067124 A | 3/2003 |

* cited by examiner

*Primary Examiner* — Tan V. Mai
(74) *Attorney, Agent, or Firm* — McDermott Will & Emery LLP

(57) ABSTRACT

The speed of pen position detection is improved without increasing the circuit area and the current consumption. A sampling circuit samples a signal and outputs sampling data. A arithmetic circuit calculates a real part and an imaginary part of the sampling data. The arithmetic circuit classifies the real part of the sampling data into one of a plurality of groups and classifies the imaginary part of the sampling data into one of the groups according to an order of output of the sampling data from the sampling circuit. Then, the arithmetic circuit adds together real parts of sampling data belonging to a group and adds together imaginary parts of sampling data belonging to a group for each of the groups, and calculates amplitude and phase of the signal by using an addition result of the real parts and an addition result of the imaginary parts of each of the groups.

13 Claims, 8 Drawing Sheets

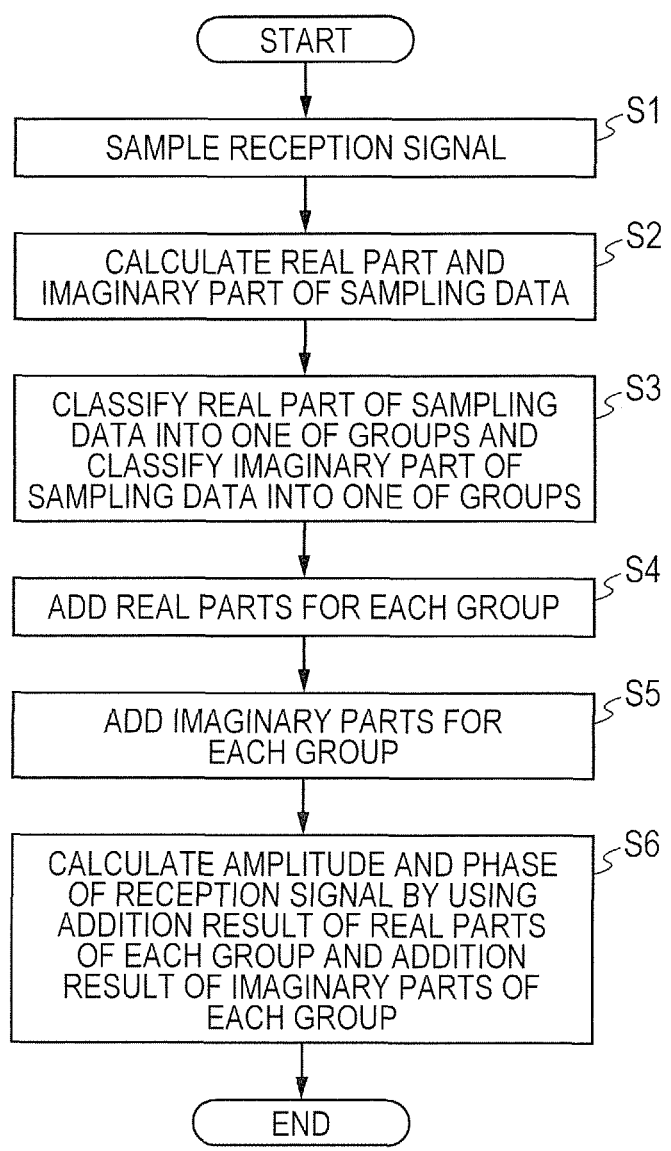

SEMICONDUCTOR DEVICE, POSITION DETECTION DEVICE, AND CONTROL METHOD OF SEMICONDUCTOR DEVICE

CROSS-REFERENCE TO RELATED APPLICATIONS

The disclosure of Japanese Patent Application no. 2016-003455 filed on Jan. 12, 2016 including the specification, drawings and abstract is incorporated herein by reference in its entirety.

BACKGROUND

The present invention relates to a semiconductor device, a position detection device, and a control method of a semiconductor device. For example, the present invention can be preferably applied to a semiconductor device that samples a signal.

A position detection device and a position indicator (typically, a pen) of an electromagnetic resonance (EMR) method are known (for example, Japanese Patent No. 2971488, Japanese Patent No. 2583500, Japanese Unexamined Patent Application Publication No. 2003-067124, and Japanese Patent No. 2635082).

According to Japanese Patent No. 2971488, the position detection device transmits and receives a signal by electro magnetic resonance between one loop coil selected from a plurality of loop coils and a pen and calculates amplitude and phase of a reception signal received from the pen. The position detection device repeats the same operation as described above by sequentially selecting the plurality of loop coils. Then, the position detection device detects the position of the pen based on amplitude and phase of a reception signal in each loop coil.

According to Japanese Patent No. 2583500, the position detection device repeats switching of transmission and reception between one loop coil and the pen seven times and averages (integrates) induction voltages (reception signals) generated in seven reception periods. The reason to perform the averaging is to alleviate effects of external noise according to Japanese Unexamined Patent Application Publication No. 2003-067124.

SUMMARY

In recent years, the position detection device is required to improve the speed of pen position detection. For example, it is possible to improve the speed of pen position detection by simultaneously processing reception signals received by a plurality of loop coils. To do this, it is considered to increase the number of parallel circuits that process the reception signals received by the loop coils.

However, simple parallelization of the circuits has a problem that the area of the circuits increases and the current consumption also increases.

Other objects and novel features will become apparent from the description of the present specification and the accompanying drawings.

According to an embodiment, a sampling circuit samples a signal. The arithmetic circuit calculates a real part and an imaginary part of sampling data. The arithmetic circuit classifies the real part of the sampling data into one of a plurality of groups and classifies the imaginary part of the sampling data into one of the groups according to an order of output of the sampling data from the sampling circuit. Then, the arithmetic circuit adds together real parts of sampling data belonging to a group and adds together imaginary parts of sampling data belonging to the group for each group, and then calculates amplitude and phase of the signal by using an addition result of real parts and an addition result of imaginary parts of each group.

According to the embodiment described above, it is possible to contribute to solving the problems described above.

BRIEF DESCRIPTION OF THE DRAWINGS

FIG. 8 is a flowchart showing an operation flow of the position detection device according to the third embodiment.

DETAILED DESCRIPTION

Prior Study by Inventors

Before describing embodiments, content of prior study performed by the inventors will be described.

As described above, according to Japanese Patent No. 2971488, the position detection device sequentially selects a plurality of loop coils, transmits and receives a signal between a selected loop coil and a pen, and detects a position of the pen based on amplitude and phase of a reception signal received from the pen. The position of the pen can be detected by using characteristics where the closer the distance between the loop coil and the pen, the greater the signal strength of the reception signal in the loop coil, and the greater the distance between the loop coil and the pen, the smaller the signal strength of the reception signal in the loop coil. According to Japanese Patent No. 2583500 and Japanese Unexamined Patent Application Publication No. 2003-067124, the position detection device repeats transmission and reception between one loop coil and the pen a plurality of times to alleviate effects of external noise.

According to Japanese Patent No. 2635082, a circuit constant of a circuit of the pen is decided so that the circuit resonates at a specific frequency (resonance frequency). The circuit of the pen can have a plurality of resonance frequencies by switching the circuit constant by a switch. By having a plurality of resonance frequencies, various functions (for example, eraser, color, and the like) are realized.

Figure 1:
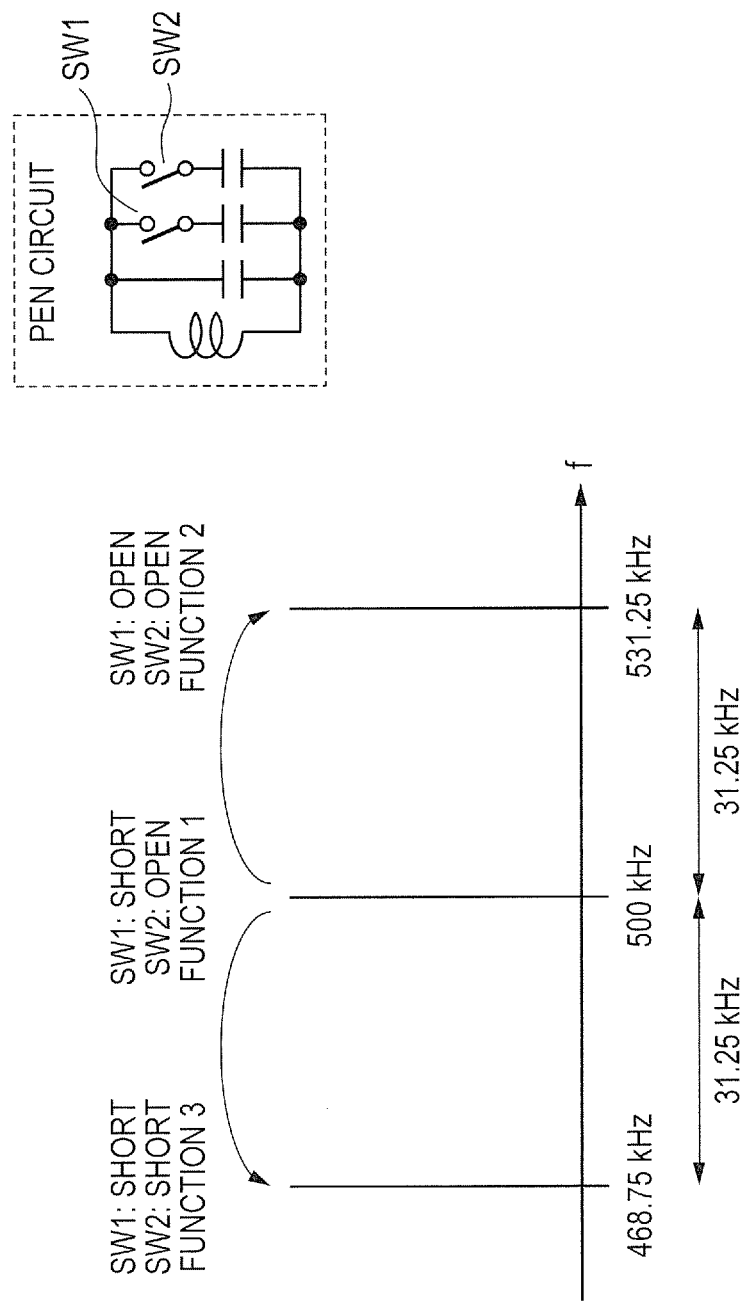
FIG. 1 is a diagram showing a pen circuit including a plurality of resonance frequencies.

For example, the pen shown in FIG. 1 have three resonance frequencies 468.75 [kHz], 500 [kHz], and 531.25 [kHz] by switching the circuit constant by two switches SW1 and SW2. Therefore, the pen can realize three functions 1, 2, and 3.

For example, the amplitude and phase of the reception signal received by the loop coil can be calculated as described below. First, the reception signal is detected by a voltage detection amplifier and converted into discrete data by an A/D converter. For example, when a signal received during a period of 32 [μsec] is sampled at a cycle (1/fs) of 250 [nsec] (sampling frequency fs=4 [MHz]), 128 digital sampling data are obtained. Discrete Fourier Transform (DFT) is performed on the sampling data by using Formulas (3) and (4) of Japanese Patent No. 2971488 and a real part and an imaginary part are extracted. Then, the amplitude and the phase of the reception signal are calculated by using the values of the extracted real part and imaginary part and Formula (5) of Japanese Patent No. 2971488.

When 128 sampling data are obtained at the sampling frequency fs=4 [MHz], DFT can be performed at a resolution of $\Delta f=31.25$ [kHz] according to Japanese Patent No. 2971488. Therefore, when f=500 [kHz], k=500 [kHz]/31.25 [kHz]=16, so that a signal of 500 [kHz] can be extracted. Here, k corresponds to the number of waves that can be inserted during a reception period. When the value of f/31.25 [kHz] is an integer, a signal can be extracted. For example, it is possible to extract a signal in the case of 531.25 [kHz] (k=17) and in the case of 468.75 [kHz] (k=15).

As described above, various functions can be realized by causing the pen to have a plurality of resonance frequencies and changing a frequency component to be extracted from the reception signal by changing the value of k.

Here, as described above, the position detection device of recent years is required to improve the speed of pen position detection. Hereinafter, comparative examples for improving the speed of pen position detection, which are studied by the inventors, will be described.

Comparative Example 1 and Problem Thereof

The comparative example 1 is to improve the speed of pen position detection by reducing the number of times of transmission/reception between one loop coil and a pen and reducing the time of transmission/reception.

However, when the number of times of transmission/reception is reduced, a population parameter to average the reception signals is reduced, so that it is not possible to sufficiently alleviate external noise.

Comparative Example 2 and Problem Thereof

The comparative example 2 is to improve the speed of pen position detection by reducing the transmission time and the reception time.

However, when the transmission time is reduced, it is not possible to sufficiently transmit a signal (power) to the pen. When the power cannot be sufficiently transmitted to the pen, the strength of the signal received by the pen is small, so that the signal is easy to be buried in noise. Further, a high-gain voltage detection amplifier is required for the pen to detect a signal of small signal strength. The signal handled by the pen is high bandwidth of several hundreds [kHz]. In general, a high-gain and high-bandwidth voltage detection amplifier has a large circuit area and its current consumption tends to increase.

On the other hand, when the reception time is reduced, the frequency that has been used on the resolution of DFT becomes unsuitable (k is not an integer), so that the reception signal may not be able to be analyzed by a calculation method of a related art. For example, in the example described above, a signal received during 32 [μsec] is sampled at a sampling frequency fs=4 [MHz] and 128 sampling data are obtained. On the other hand, a case is considered in which 64 data are obtained at the sampling frequency fs=4 [MHz] during a period of 16 [μsec] which is half the time of the above. In this case, DFT can be performed at a resolution of $\Delta f=62.5$ [kHz] from the above calculation. When f=500 [kHz], k=500 [kHz]/62.5 [kHz]=8, so that a signal of 500 [kHz] can be extracted. However, in the case of 531.25 [kHz] (k=8.5) and in the case of 468.75 [kHz] (k=7.5), k is not an integer, so that it is not possible to extract a signal. Therefore, when using a pen that has three resonance frequencies 468.75 [kHz], 500 [kHz], and 531.25 [kHz], it is required to change a circuit constant of the pen and change the resonance frequency, so that there is no downward compatibility of the pen.

Comparative Example 3 and Problem Thereof

The comparative example 3 is to improve the speed of pen position detection by using a plurality of circuits (voltage detection amplifiers and A/D converters), which process the reception signals received by loop coils, in parallel and simultaneously processing the reception signals received by two or more loop coils.

However, simple parallelization of the circuits causes the circuit area to increase and also causes the current consumption to increase.

Embodiments

Hereinafter, embodiments will be described. For clarity of explanation, the following description and drawings are appropriately omitted and simplified. The components shown in the drawings as functional blocks that perform various processing can be formed by a CPU (Central Processing Unit), a memory, and other circuits as hardware and are realized by a program and the like loaded in a memory as software. Therefore, it should be understood by those skilled in the art that the functional blocks can be realized in various forms by only hardware, only software, or a combination of these, and the functional blocks are not limited to any one of hardware, software, and a combination of these. In the drawings, the same components are denoted by the same reference symbols and redundant description is omitted as appropriate.

The program described above can be stored in various types of non-transitory computer readable media and supplied to a computer. The non-transitory computer readable media include various types of tangible storage media. Examples of the non-transitory computer readable media include a magnetic recording medium (for example, flexible disk, magnetic tape, and hard disk drive), a magneto-optical recording medium (for example, magneto-optical disk), a CD-ROM (Read Only Memory), a CD-R, a CD-R/W, a semiconductor memory (for example, mask ROM, PROM (Programmable ROM), EPROM (Erasable PROM), flash ROM, RAM (Random Access Memory)). The program may be supplied to a computer by various types of transitory computer readable media. Examples of the transitory computer readable media include an electrical signal, an optical signal, and an electromagnetic wave. The transitory computer readable media can supply the program to a computer through a wired communication path such as an electrical wire and an optical fiber or a wireless communication path.

First Embodiment

Configuration of First Embodiment

Figure 2:
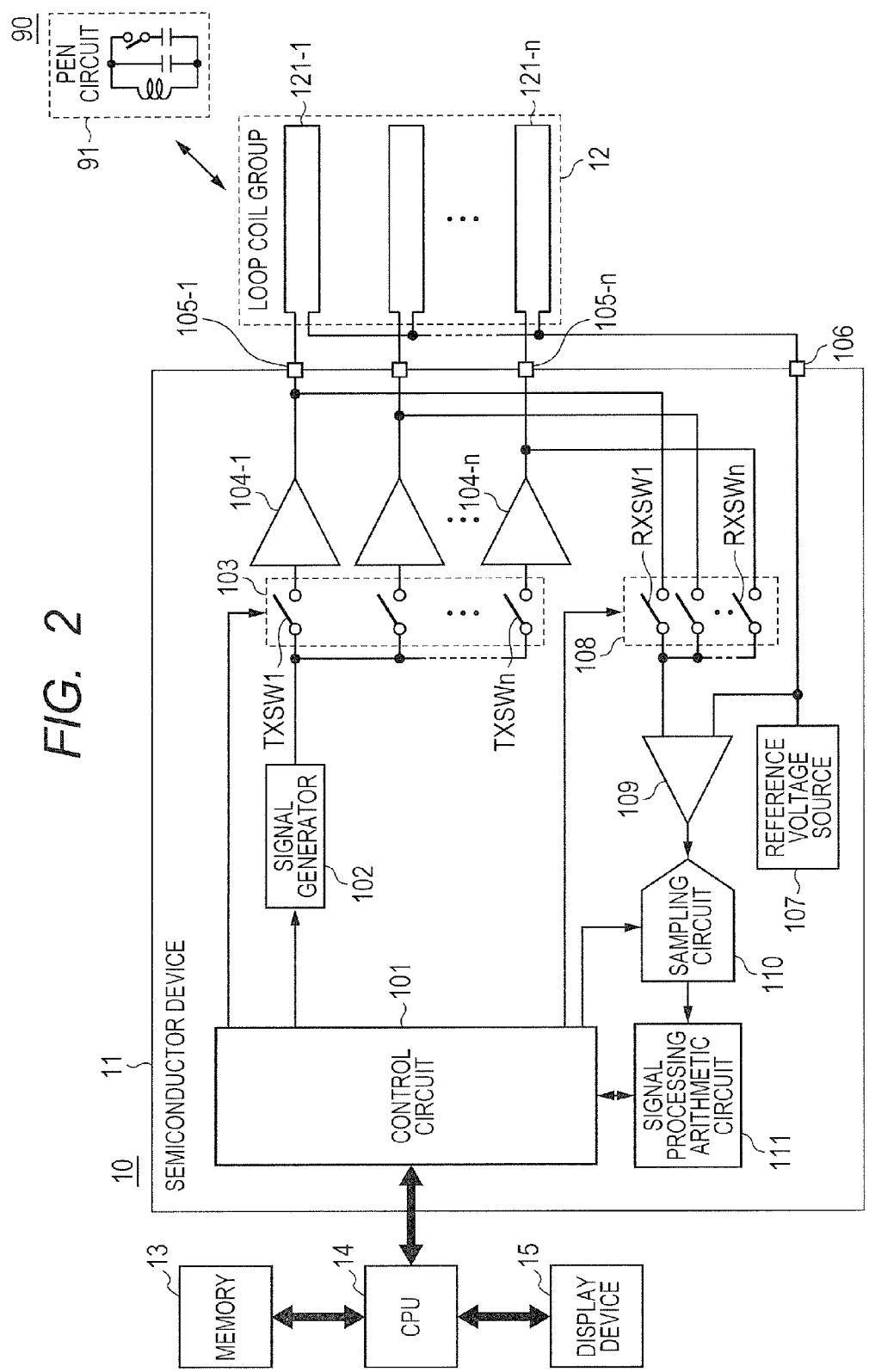
FIG. 2 is a diagram showing a configuration of a position detection device according to first and second embodiments.

FIG. 2 shows a configuration of a position detection device 10 according to the first embodiment. the position detection device 10 according to the first embodiment detects a position indicated by a pen 90. The pen 90 includes a pen circuit 91 that can switch first and second resonance frequencies. The pen 90 can transmit and receive a signal to and from n (n is an integer greater than or equal to 2) loop coils 121-1 to 121-*n* (hereinafter referred to as a loop coil 121 when not specifying a specific loop coil) described later by electro magnetic resonance.

The position detection device 10 according to the first embodiment includes a semiconductor device 11 that is an IC (Integrated Circuit), a loop coil group 12, a memory 13, a CPU 14, and a display device 15. The semiconductor device 11 includes a control circuit 101, a signal generator 102, a transmission channel selection switch group 103, n transmission drivers 104-1 to 104-*n* (hereinafter referred to as a transmission driver 104 when not specifying a specific transmission driver), n input/output terminals 105-1 to 105-*n* (hereinafter referred to as an input/output terminal 105 when not specifying a specific input/output terminal), a voltage output terminal 106, a reference voltage source 107, a reception channel selection switch group 108, a voltage detection amplifier 109, a sampling circuit 110, and a signal processing arithmetic circuit 111.

The loop coil group 12 includes n loop coils 121-1 to 121-*n* that transmits and receives a signal to and from the pen 90 by electromagnetic resonance. One ends of the loop coils 121-1 to 121-*n* are respectively coupled to the input/output terminals 105-1 to 105-*n*, and the other ends are coupled to the voltage output terminal 106.

The signal generator 102 generates transmission signals of first and second frequencies respectively corresponding to first and second resonance frequencies of the pen circuit 91.

The transmission channel selection switch group 103 includes n transmission channel selection switches TXSW1 to TXSWn (hereinafter referred to as a transmission channel selection switch TXSW when not specifying a specific transmission channel selection switch) provided corresponding to the loop coils 121-1 to 121-*n*, respectively. When one of the loop coils 121-1 to 121-*n* is selected, a transmission channel selection switch TXSW corresponding to the selected loop coil 121 is caused to be a closed state by an instruction signal from the control circuit 101. Thereby, an input of the transmission driver 104 corresponding to the selected loop coil 121 and an output of the signal generator 102 are coupled to each other.

The transmission drivers 104-1 to 104-*n* are provided corresponding to the loop coils 121-1 to 121-*n*, respectively. When the transmission driver 104 is coupled to the signal generator 102, the transmission driver 104 amplifies a transmission signal generated by the signal generator 102 and outputs the amplified transmission signal to the corresponding loop coil 121 through the input/output terminal 105.

The reference voltage source 107 generates a reference voltage, supplies the generated reference voltage to the voltage detection amplifier 109, and also supplies the generated reference voltage to the loop coils 121-1 to 121-*n* through the voltage output terminal 106.

The reception channel selection switch group 108 includes n reception channel selection switches RXSW1 to RXSWn (hereinafter referred to as a reception channel selection switch RXSW when not specifying a specific reception channel selection switch) provided corresponding to the loop coils 121-1 to 121-*n*, respectively. When one of the loop coils 121-1 to 121-*n* is selected, a transmission channel selection switch RXSW corresponding to the selected loop coil 121 is caused to be a closed state by an instruction signal from the control circuit 101. Thereby, the selected loop coil 121 and an input of the voltage detection amplifier 109 are coupled to each other through the input/output terminal 105.

When the voltage detection amplifier 109 is coupled to one of the loop coils 121-1 to 121-*n*, the voltage detection amplifier 109 detects and amplifies a reception signal received by the coupled loop coil 121.

The sampling circuit 110 samples the reception signal outputted from the voltage detection amplifier 109 by a sampling clock from the control circuit 101. The sampling circuit 110 is typically realized by an A/D converter.

The signal processing arithmetic circuit 111 performs various arithmetic operations including DFT on sampling data outputted from the sampling circuit 110 and calculates amplitude and phase of the reception signal.

The control circuit 101 controls the signal generator 102, the transmission channel selection switch group 103, the reception channel selection switch group 108, the sampling circuit 110, and the signal processing arithmetic circuit 111.

The CPU 14 performs control of the semiconductor device 11 and the display device 15, storing of calculation result received from the semiconductor device 11 to the memory 13, position detection of the pen 90 based on a calculation result of the semiconductor device 11, display of a location indicated by the pen 90 to the display device 15, and the like. A part of the functions such as the storing of calculation result to the memory 13 and the position detection of the pen 90 that are performed by the CPU 14 may be performed by another semiconductor device such as a dedicated microcontroller or may be performed by the control circuit 101 and/or the signal processing arithmetic circuit 111 of the semiconductor device 11.

Figure 3:
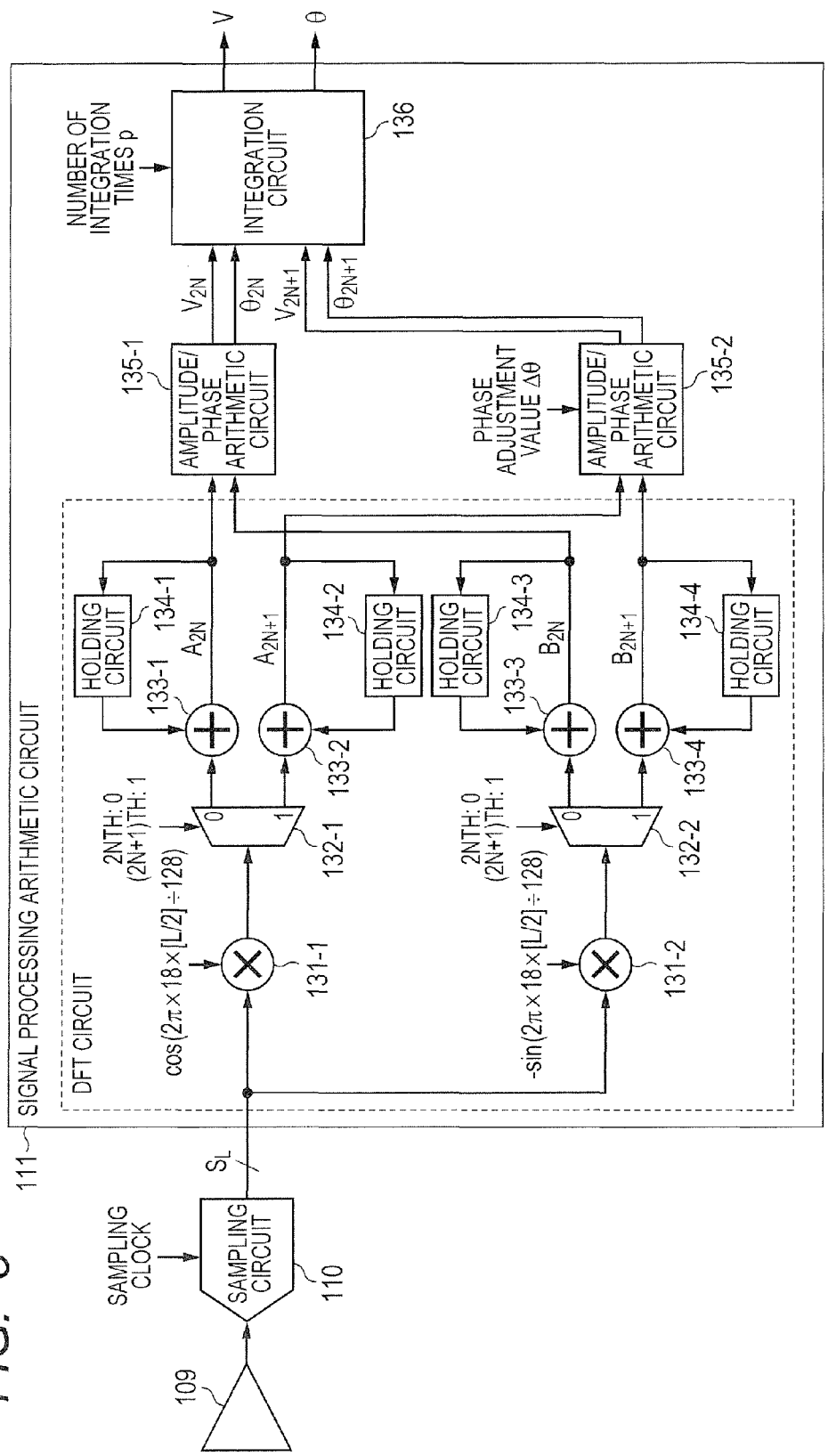
FIG. 3 is a diagram showing a configuration of a signal processing arithmetic circuit according to the first embodiment.

FIG. 3 shows an internal configuration of the signal processing arithmetic circuit 111 according to the first embodiment. In FIG. 3, numerical values such as frequencies are examples, and not limited to these values.

In the first embodiment, the sampling circuit 110 samples a reception signal which is a sine wave of f=500 [kHz] outputted from the voltage detection amplifier 109 at a rise of a sampling clock of fs=8 [MHz] and outputs sampling data $S_L$ to the signal processing arithmetic circuit 111 at the same timing. L is an integer from 0 to 255 and is incremented to L=L+1 in synchronization with the sampling clock. [L/2] is an integer part of a quotient obtained by dividing L by 2.

The signal processing arithmetic circuit 111 according to the first embodiment includes multipliers 131-1 and 131-2, output selectors 132-1 and 132-2, adders 133-1 to 133-4, holding circuits 134-1 to 134-4, amplitude/phase arithmetic circuits 135-1 and 135-2, and an integration circuit 136.

The multiplier 131-1 multiplies the sampling data $S_L$ by $\cos(2\pi \times 18 \times [L/2] \div 128)$. The multiplier 131-2 multiplies the sampling data $S_L$ by $-\sin(2\pi \times 18 \times [L/2] \div 128)$. The multiplication result of the multiplier 131-1 is a real part of the sampling data $S_L$. The multiplication result of the multiplier 131-2 is an imaginary part of the sampling data $S_L$.

A selection signal that instructs to select an output 0 when L is 2Nth (even number, N is an integer greater than or equal to 0) and instructs to select an output 1 when L is (2N+1)th (odd number) is inputted to the output selectors 132-1 and 132-2 from the control circuit 101. The output selector 132-1 selects either one of the output 0 and the output 1 based on the selection signal and outputs the multiplication result of the multiplier 131-1 from the selected output. The output selector 132-2 selects either one of the output 0 and the output 1 based on the selection signal and outputs the multiplication result of the multiplier 131-2 from the selected output. The output selectors 132-1 and 132-2 output "0" from the output that is not selected.

The adder 133-1 adds a 2Nth value outputted from the output 0 of the output selector 132-1 and a value of the holding circuit 134-1. The adder 133-2 adds a (2N+1)th value outputted from the output 1 of the output selector 132-1 and a value of the holding circuit 134-2. The adder 133-3 adds a 2Nth value outputted from the output 0 of the output selector 132-2 and a value of the holding circuit 134-3. The adder 133-4 adds a (2N+1)th value outputted from the output 1 of the output selector 132-2 and a value of the holding circuit 134-4.

The holding circuits 134-1 to 134-4 respectively hold addition results of the adders 133-1 to 133-4 one clock before the current sampling clock.

When L becomes 255, only a 2Nth real part $A_{2N}$ which is the addition result of the adder 133-1 and only a 2Nth imaginary part $B_{2N}$ which is the addition result of the adder 133-3 are outputted to the amplitude/phase arithmetic circuit 135-1. Further, only a (2N+1)th real part $A_{2N+1}$ which is the addition result of the adder 133-2 and only a (2N+1)th imaginary part $B_{2N+1}$ which is the addition result of the adder 133-4 are outputted to the amplitude/phase arithmetic circuit 135-2.

Here, in the signal processing arithmetic circuit 111, a DFT circuit (Discrete Fourier Transform circuit) is formed from the multipliers 131-1 and 131-2, the output selectors 132-1 and 132-2, the adders 133-1 to 133-4, and the holding circuits 134-1 to 134-4. In other words, in the signal processing arithmetic circuit 111, the DFT performs processing to obtain the real part $A_{2N}$, the imaginary part $B_{2N}$, the real part $A_{2N+1}$, and the imaginary part $B_{2N+1}$ from the sampling data $S_L$.

The amplitude/phase arithmetic circuit 135-1 calculates 2Nth amplitude $V_{2N}$ and phase $\theta_{2N}$ based on the 2Nth real part $A_{2N}$ and imaginary part $B_{2N}$ and outputs calculation results to the integration circuit 136. The amplitude/phase arithmetic circuit 135-2 calculates (2N+1)th amplitude $V_{2N+1}$ and phase $\theta_{2N+1}$ based on the (2N+1)th real part $A_{2N+1}$ and imaginary part $B_{2N+1}$ and outputs calculation results to the integration circuit 136. At this time, regarding the phase $\theta_{2N+1}$, a phase advance occurs from $\theta_{2N}$. Therefore, the amplitude/phase arithmetic circuit 135-2 performs a correction to subtract a phase adjustment value $\Delta\theta$.

The integration circuit 136 integrates amplitudes $V_{2N}$ and $V_{2N+1}$ and phases $\theta_{2N}$ and $\theta_{2N+1}$ which are obtained from data of a plurality of times of receptions. The influence of external noise is alleviated by the integration. The number of integration times p in the integration circuit 136 can be arbitrarily set.

Operation of Related Art Example

Figure 4:
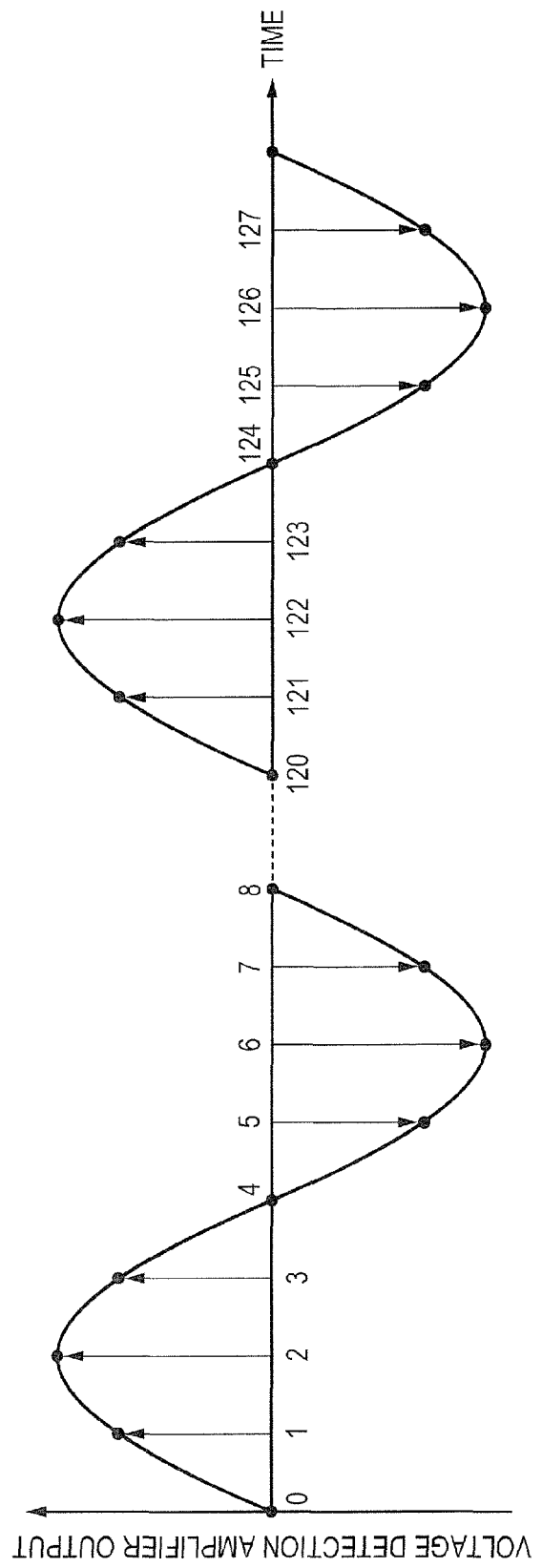
FIG. 4 is a diagram showing a situation of sampling according to a related art.

To facilitate the description of the operation of the first embodiment, first, an operation of a related art example studied by the inventors will be described. In the related art example, a sign wave reception signal of frequency f=500 [kHz] outputted from a voltage detection amplifier is sampled by a sampling circuit at a sampling frequency fs=4 [MHz] during a period of 32 [μsec]. FIG. 4 shows a condition of the sampling.

As shown in FIG. 4, the sampling is performed at regular intervals. The numbers in FIG. 4 represent the order of the sampling. The number of sampling data obtained during a period of 32 [μsec] is 32 [μsec]/(¼ [MHz])=128. The sampling data obtained at 0th time is $S_0$ and the sampling data obtained at 1st time is $S_1$. In the same manner, the sampling data obtained at 127th time is $S_{127}$. While the transmission/reception is performed a plurality of times to reduce the influence of external noise, the DFT is performed on only a frequency component of f=500 [kHz] (k=18) of a reception signal obtained from the first transmission/reception. When the real part obtained as a result of the DFT is defined as $A_1$ and the imaginary part is defined as $B_1$, $A_1$ and $B_1$ are respectively calculated as follows:

$$A_1 = \frac{1}{128}\sum_{L=0}^{127} S_L \times \cos(2\pi \times 18 \times L \div 128) \quad \text{[Formula 1]}$$

$$B_1 = \frac{1}{128}\sum_{L=0}^{127} S_L \times -\sin(2\pi \times 18 \times L \div 128)$$

The above calculation is performed for the number of times corresponding to the number of receptions.

In BACKGROUND, it is described that the number of times where the transmission/reception is repeated is seven. However, for ease of explanation, the number of times is defined as four. A real part calculated from a sampling obtained from the fourth transmission/reception is defined as $A_4$ and an imaginary part is defined as $B_4$. When the real parts and the imaginary parts of the first to the fourth transmission/reception are respectively integrated, the integration value A of the real parts and the integration value B of the imaginary part are as follows respectively:

$$A = A_1 + A_2 + A_3 + A_4$$

$$B = B_1 + B_2 + B_3 + B_4 \quad \text{[Formula 2]}$$

An amplitude V of the reception signal can be calculated as follows:

$$V = \sqrt{A^2 + B^2} \quad \text{[Formula 3]}$$

A phase $\theta$ can be calculated as follows:

$$\theta = \tan^{-1}\left(\frac{B}{A}\right) \quad \text{[Formula 4]}$$

In the above description, when $A_1$ to $A_4$ and $B_1$ to $B_4$ are obtained, each value is multiplied by 1/128. However, it is not limited to this. In the case of amplitude, if $A_1$ to $A_4$ and $B_1$ to $B_4$ are not multiplied by 1/128 when obtaining $A_1$ to $A_4$ and $B_1$ to $B_4$, and $A_1$ to $A_4$ and $B_1$ to $B_4$ are multiplied by 1/128 after V is obtained, each result is equivalent to being multiplied by 1/128 when obtaining $A_1$ to $A_4$ and $B_1$ to $B_4$. For example, X and Y are defined as follows respectively:

$$X = \sum_{L=0}^{127} S_L \times \cos(2\pi \times 18 \times L \div 128). \quad \text{[Formula 5]}$$

$$Y = \sum_{L=0}^{127} S_L \times -\sin(2\pi \times 18 \times L \div 128).$$

Then, $A_1$ and $B_1$ are as follows:

$$A_1 = \frac{1}{128}X, \quad B_1 = \frac{1}{128}Y \quad \text{[Formula 6]}$$

An amplitude $V_1$ is as follows:

$$V_1 = \sqrt{A_1^2 + B_1^2} = \sqrt{\left(\frac{1}{128}X\right)^2 + \left(\frac{1}{128}Y\right)^2} = \sqrt{\left(\frac{1}{128}\right)^2 \times (X^2 + Y^2)} = \frac{1}{128}\sqrt{X^2 + Y^2} \quad \text{[Formula 7]}$$

On the other hand, a phase $\theta_1$ is as follows:

$$\theta_1 = \tan^{-1}\left(\frac{B_1}{A_1}\right) = \tan^{-1}\left(\frac{\frac{1}{128}Y_1}{\frac{1}{128}X_1}\right) = \tan^{-1}\left(\frac{Y_1}{X_1}\right). \quad \text{[Formula 8]}$$

That is, when the reception signal outputted from the voltage detection amplifier is sampled at a sampling frequency fs=4 [MHz] during a period of 32 [μsec] to obtain 128 sampling data and a frequency component of f=500 [kHz] is extracted, $A_1$ and $B_1$ are calculated as follows ($A_2$ to $A_4$ and $B_2$ to $B_4$ are also calculated in the same manner):

$$A_1 = \sum_{L=0}^{127} S_L \times \cos(2\pi \times 18 \times L \div 128) \quad \text{[Formula 9]}$$

$$B_1 = \sum_{L=0}^{127} S_L \times -\sin(2\pi \times 18 \times L \div 128).$$

The amplitude V of the reception signal can be calculated as follows:

$$V = \frac{1}{128}\sqrt{A^2 + B^2}. \quad \text{[Formula 10]}$$

The phase $\theta$ can be calculated as follows:

$$\theta = \tan^{-1}\left(\frac{B}{A}\right) \quad \text{[Formula 11]}$$

When the pen position is detected by comparing a relative value of the amplitude V with that of another loop coil, the amplitude V need not be multiplied by $\frac{1}{128}$.

Further, regarding the integration, even when the values of the real parts and the imaginary parts obtained by a plurality of times of transmission/reception are not integrated and the amplitudes and the phases obtained by the plurality of times of transmission/reception are integrated, substantially the same value is obtained (in the case of phases, the phases are divided by the number of times of integrations).

When changing a frequency component to be extracted, for example, in the case of f=468.75 [kHz] (k=19), $A_1$ and $B_1$ are respectively calculated as follows:

$$A_1 = \sum_{L=0}^{127} S_L \times \cos(2\pi \times 17 \times L \div 128) \quad \text{[Formula 12]}$$

$$B_1 = \sum_{L=0}^{127} S_L \times -\sin(2\pi \times 17 \times L \div 128).$$

In the case of f=531.25 [kHz] (k=19), $A_1$ and $B_1$ are respectively calculated as follows:

$$A_1 = \sum_{L=0}^{127} S_L \times \cos(2\pi \times 19 \times L \div 128) \quad \text{[Formula 13]}$$

$$B_1 = \sum_{L=0}^{127} S_L \times -\sin(2\pi \times 19 \times L \div 128).$$

In this way, k may be changed according to the frequency component to be extracted.

Operation of First Embodiment

Figure 5:
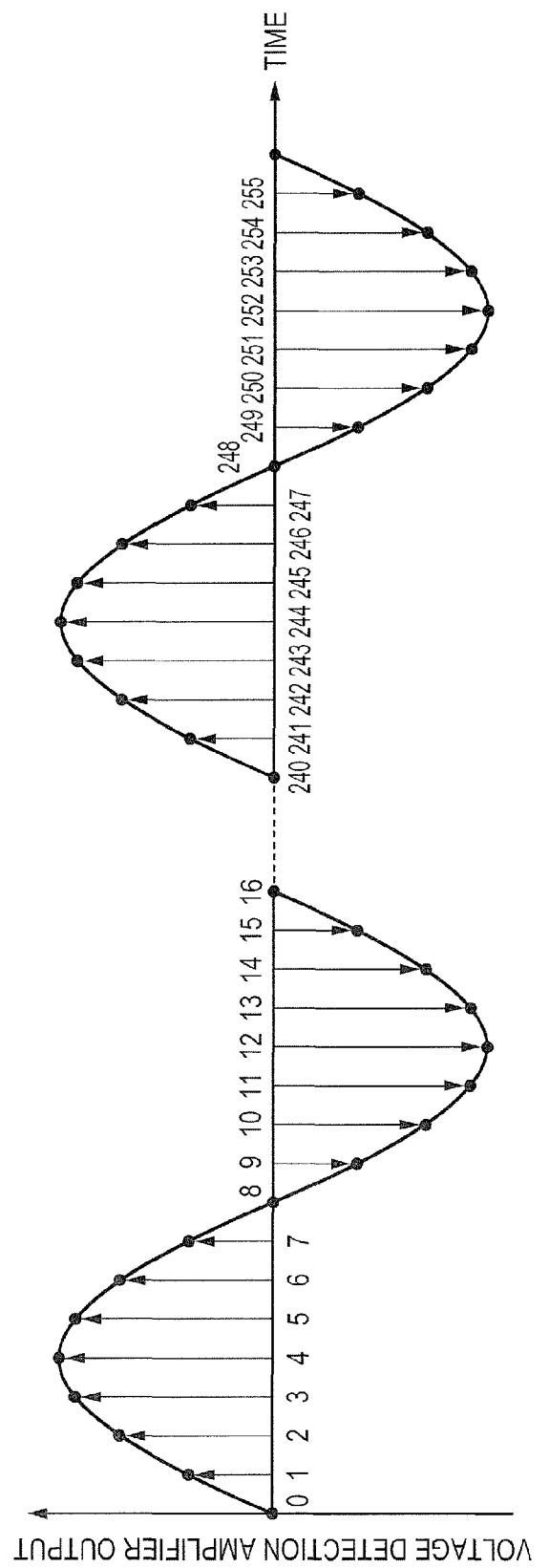
FIG. 5 is a diagram showing a situation of sampling according to the first and the second embodiments.

Next, an operation of the first embodiment will be described. In the first embodiment, a sign wave reception signal of frequency f=500 [kHz] outputted from the voltage detection amplifier 109 is sampled by the sampling circuit 110 during a period of 32 [μsec] at a sampling frequency fs=8 [MHz] that is two times that of the related art example. FIG. 5 shows a condition of the sampling.

As shown in FIG. 5, the number of sampling data obtained during a period of 32 [μsec] is 32 [μsec]/($\frac{1}{8}$ [MHz])=256. The sampling data obtained at 0th time is $S_0$ and the sampling data obtained at 1st time is $S_1$. In the same manner, the sampling data obtained at 255th time is $S_{255}$. Arithmetic processing is performed by dividing the 256 sampling data into 128 sampling data which are 2Nth (even-number-th) sampling data and 128 sampling data which are (2N+1)th (odd-number-th) sampling data.

In the 2Nth sampling data, a real part and an imaginary part of only a frequency component of f=500 [kHz] (k=18) are defined as $A_{2N}$ and $B_{2N}$, respectively. In the (2N+1)th sampling data, a real part and an imaginary part of only a frequency component of f=500 [kHz] (k=18) are defined as $A_{2N+1}$ and $B_{2N+1}$, respectively. Then, $A_{2N}$, $B_{2N}$, $A_{2N+1}$ and $B_{2N+1}$ can be respectively represented by formulas described below. M is an integer from 0 to 127 and M is [L/2]. As described above, [L/2] is an integer part of a quotient obtained by dividing L by 2.

$$A_{2N} = \sum_{M=0}^{127} S_{2M} \times \cos(2\pi \times 18 \times M \div 128) \quad \text{[Formula 14]}$$

$$B_{2N} = \sum_{M=0}^{127} S_{2M} \times -\sin(2\pi \times 18 \times M \div 128)$$

$$A_{2N+1} = \sum_{M=0}^{127} S_{2M+1} \times \cos(2\pi \times 18 \times M \div 128)$$

$$B_{2N+1} = \sum_{M=0}^{127} S_{2M+1} \times -\sin(2\pi \times 18 \times M \div 128).$$

The same calculations can be performed in the case of f=468.75 [kHz] (k=17) and in the case of f=531.25 [kHz] (k=19).

Regarding the phase, a phase difference occurs between $\theta_{2N}$ and $\theta_{2N+1}$ described below.

$$\theta_{2N} = \tan^{-1}\left(\frac{B_{2N}}{A_{2N}}\right). \quad \text{[Formula 15]}$$

$$\theta_{2N+1} = \tan^{-1}\left(\frac{B_{2N+1}}{A_{2N+1}}\right).$$

The reason of the above is that DFT is performed on the 2Nth sampling data and the (2N+1)th sampling data by using the same coefficient.

The phase difference is obtained by the following formula.

$$\Delta\theta = 360 \Big/ \left(\frac{1}{f}\right) \Big/ \left(\frac{1}{fs}\right) \; [deg] \quad \text{[Formula 16]}$$

In the example of f=500 [kHz] and fs=8 [MHz], the phase difference is obtained by the following formula.

$$\Delta\theta = 360 \Big/ \left(\frac{1}{500 \text{ kHz}}\right) \Big/ \left(\frac{1}{8 \text{ MHz}}\right) = 22.5 \; [deg]. \quad \text{[Formula 17]}$$

The phase difference is uniquely determined by f and fs, so that $\theta_{2N+1}$ can be obtained by uniformly subtracting $\Delta\theta$.

Hereinafter, operations of the voltage detection amplifier 109, the sampling circuit 110, and the signal processing arithmetic circuit 111, which realize the above calculation, will be described. As a signal transmission/reception method between the loop coil and the pen 90 and a pen position detection method that uses amplitude and phase that are outputs of the signal processing arithmetic circuit 111, the same methods as those used in the related art are used. A value "0" is inputted in the holding circuits 134-1 to 134-4 and L in an initial state.

First, sampling data $S_0$ is outputted from the sampling circuit 110. In the next stage multiplier 131-1, the following calculation is performed.

$$S_0 \times \cos(2\pi \times 18 \times 0 \div 128) \quad \text{[Formula 18]}$$

On the other hand, in the multiplier 131-2, the following calculation is performed.

$$S_0 \times \sin(2\pi \times 18 \times 0 \div 128) \quad \text{[Formula 19]}$$

L is 0 and the sampling data is 2Nth (even-number-th) sampling data, so that the output 0 is selected in the output selector 132-1 and the output selector 132-2. Therefore, the adder 133-1 adds the output of the holding circuit 134-1 and the output of the output selector 132-1.

$$A_{2N} = 0 + S_0 \times \cos(2\pi \times 18 \times 0 \div 128) \quad \text{[Formula 20]}$$

Similarly, the adder 133-3 adds the output of the holding circuit 134-3 and the output of the output selector 132-2.

$$B_{2N} = 0 + S_0 \times -\sin(2\pi \times 18 \times 0 \div 128) \quad \text{[Formula 21]}$$

The output selector 132-1 does not select the output 1 ("0" is outputted from the output 1), so that the adder 133-2 adds the output of the holding circuit 134-2 and "0".

$$A_{2N+1} = 0 + 0 \quad \text{[Formula 22]}$$

Similarly, the adder 133-4 adds the output of the holding circuit 134-4 and "0".

$$B_{2N+1} = 0 + 0 \quad \text{[Formula 23]}$$

At a timing of the next sampling clock, L=L+1, that is, L=1, is established and sampling data $S_1$ is outputted from the sampling circuit 110. At the same timing, $A_{2N}$, $A_{2N+1}$, $B_{2N}$, and $B_{2N+1}$ are inputted into the holding circuits 134-1 to 134-4, respectively. In the next stage multiplier 131-1, the following calculation is performed.

$$S_1 \times \cos(2\pi \times 18 \times 0 \div 128) \quad \text{[Formula 24]}$$

On the other hand, in the multiplier 131-2, the following calculation is performed.

$$S_1 \times -\sin(2\pi \times 18 \times 0 \div 128) \quad \text{[Formula 25]}$$

L is 1 and the sampling data is (2N+1)th (odd-number-th) sampling data, so that the output 1 is selected in the output selector 132-1 and the output selector 132-2. Therefore, the adder 133-2 adds the output of the holding circuit 134-2 and the output of the output selector 132-1.

$$A_{2N+1} = 0 + S_1 \times \cos(2\pi \times 18 \times 0 \div 128) \quad \text{[Formula 26]}$$

Similarly, the adder 133-4 adds the output of the holding circuit 134-4 and the output of the output selector 132-2.

$$B_{2N+1} = 0 + S_1 \times -\sin(2\pi \times 18 \times 0 \div 128) \quad \text{[Formula 27]}$$

The output selector 132-1 does not select the output 0 ("0" is outputted from the output 0), so that the adder 133-1 adds the output of the holding circuit 134-1 and "0".

$$A_{2N} = S_0 \times \cos(2\pi \times 18 \times 0 \div 128) + 0 \quad \text{[Formula 28]}$$

Similarly, the adder 133-3 adds the output of the holding circuit 134-3 and "0".

$$B_{2N} = S_0 \times -\sin(2\pi \times 18 \times 0 \div 128) + 0 \quad \text{[Formula 29]}$$

At a timing of the next sampling clock, L=L+1, that is, L=2, is established and sampling data $S_2$ is outputted from the sampling circuit 110. At the same timing, $A_{2N}$, $A_{2N+1}$, $B_{2N}$, and $B_{2N+1}$ are inputted into the holding circuits 134-1 to 134-4, respectively. In the next stage multiplier 131-1, the following calculation is performed.

$$S_2 \times \cos(2\pi \times 18 \times 1 \div 128) \quad \text{[Formula 30]}$$

On the other hand, in the multiplier 131-2, the following calculation is performed.

$$S_2 \times -\sin(2\pi \times 18 \times 1 \div 128) \quad \text{[Formula 31]}$$

L is 0 and the sampling data is 2Nth (even-number-th) sampling data, so that the output 0 is selected in the output selector 132-1 and the output selector 132-2. Therefore, the adder 133-1 adds the output of the holding circuit 134-1 and the output of the output selector 132-1.

$$A_{2N} = S_0 \times \cos(2\pi \times 18 \times 0 \div 128) + S_2 \times \cos(2\pi \times 18 \times 1 \div 128) \quad \text{[Formula 32]}$$

Similarly, the adder 133-3 adds the output of the holding circuit 134-3 and the output of the output selector 132-2.

$$B_{2N} = S_0 \times -\sin(2\pi \times 18 \times 0 \div 128) + S_2 \times -\sin(2\pi \times 18 \times 1 \div 128) \quad \text{[Formula 33]}$$

The output selector 132-1 does not select the output 1 ("0" is outputted from the output 1), so that the adder 133-2 adds the output of the holding circuit 134-2 and "0".

$$A_{2N+1} = 0 + S_1 \times \cos(2\pi \times 18 \times 0 \div 128) \quad \text{[Formula 34]}$$

Similarly, the adder 133-4 adds the output of the holding circuit 134-4 and "0".

$$B_{2N+1} = 0 + S_1 \times -\sin(2\pi \times 18 \times 0 \div 128) \quad \text{[Formula 35]}$$

The above processing is repeated until L becomes 255. When L becomes 255 and the series of calculations are completed, the 2Nth real part $A_{2N}$ is represented as follows:

$$A_{2N}=S_0 \times \cos(2\pi \times 18 \times 0 \div 128)+S_2 \times \cos(2\pi \times 18 \times 1 \div 128)+ \ldots +S_{252} \times \cos(2\pi \times 18 \times 126 \div 128)+S_{254} \times \cos(2\pi \times 18 \times 127 \div 128)$$ [Formula 36]

The 2Nth imaginary part $B_{2N}$ is represented as follows:

$$B_{2N}=S_0 \times -\sin(2\pi \times 18 \times 0 \div 128)+S_2 \times -\sin(2\pi \times 18 \times 1 \div 128)+ \ldots +S_{252} \times -\sin(2\pi \times 18 \times 126 \div 128)+S_{254} \times -\sin(2\pi \times 18 \times 127 \div 128)$$ [Formula 37]

The (2N+1)th real part $A_{2N+1}$ is represented as follows:

$$A_{2N+1}=S_1 \times \cos(2\pi \times 18 \times 0 \div 128)+S_3 \times \cos(2\pi \times 18 \times 1 \div 128)+ \ldots +S_{253} \times \cos(2\pi \times 18 \times 126 \div 128)+S_{255} \times \cos(2\pi \times 18 \times 127 \div 128)$$ [Formula 38]

The (2N+1)th imaginary part $B_{2N+1}$ is represented as follows:

$$B_{2N+1}=S_1 \times -\sin(2\pi \times 18 \times 0 \div 128)+S_3 \times -\sin(2\pi \times 18 \times 1 \div 128)+ \ldots +S_{253} \times -\sin(2\pi \times 18 \times 126 \div 128)+S_{255} \times -\sin(2\pi \times 18 \times 127 \div 128)$$ [Formula 39]

Therefore, when M=[L/2] as described above, $A_{2N}$, $B_{2N}$, $A_{2N+1}$, and $B_{2N+1}$ are respectively represented by the following formulas.

$$A_{2N} = \sum_{M=0}^{127} S_{2M} \times \cos(2\pi \times 18 \times M \div 128)$$ [Formula 40]

$$B_{2N} = \sum_{M=0}^{127} S_{2M} \times -\sin(2\pi \times 18 \times M \div 128)$$

$$A_{2N+1} = \sum_{M=0}^{127} S_{2M+1} \times \cos(2\pi \times 18 \times M \div 128)$$

$$B_{2N+1} = \sum_{M=0}^{127} S_{2M+1} \times -\sin(2\pi \times 18 \times M \div 128).$$

The amplitude $V_{2N}$ calculated by the amplitude/phase arithmetic circuit 135-1 by using the values of $A_{2N}$, $B_{2N}$, $A_{2N+1}$, and $B_{2N+1}$ is as follows:

$$V_{2N} = \frac{1}{128}\sqrt{A_{2N}^2 + B_{2N}^2}$$ [Formula 41]

The phase $\theta_{2N}$ is as follows:

$$\theta_{2N} = \tan^{-1}\left(\frac{B_{2N}}{A_{2N}}\right).$$ [Formula 42]

The amplitude $V_{2N+1}$ calculated by the amplitude/phase arithmetic circuit 135-2 is as follows:

$$V_{2N+1} = \frac{1}{128}\sqrt{A_{2N+1}^2 + B_{2N+1}^2}$$ [Formula 43]

The phase $\theta_{2N+1}$, whose phase difference is corrected, is as follows:

$$\theta_{2N+1} = \tan^{-1}\left(\frac{B_{2N+1}}{A_{2N+1}}\right) - \Delta\theta.$$ [Formula 44]

In the case of this example, $\Delta\theta$ is 22.5 [deg].

The values of $V_{2N}$, $\theta_{2N}$, $V_{2N+1}$, and $\theta_{2N+1}$ are integrated by the next stage integration circuit 136. The value of the integration circuit 136 is integrated by the next stage integration circuit 136 according to the number of integration times p. The number of times when the integration is performed by the integration circuit 136 can be set by the number of integration times p. In the case of p=1, the amplitude V and the phase θ are respectively calculated as follows:

$$V=V_{2N}+V_{2N+1}$$

$$\theta=(\theta_{2N}+\theta_{2N+1})/2$$ [Formula 45]

In this way, the data of amplitude and phase, which is obtained by performing transmission/reception twice in the related art, can be obtained by one-time transmission/reception.

In the case of p=2, when the first time amplitudes and phases are defined as $V_{2N(1)}$, $V_{2N+1(1)}$, $\theta_{2N(1)}$, and $\theta_{2N+1(1)}$, and the second time amplitudes and phases are defined as $V_{2N(2)}$, $V_{2N+1(2)}$, $\theta_{2N(2)}$, and $\theta_{2N+1(2)}$, the amplitude V and the phase θ are respectively calculated as follows:

$$V=V_{2N(1)}+V_{2N+1(1)}+V_{2N(2)}+V_{2N+1(2)}$$

$$\theta=(\theta_{2N(1)}+\theta_{2N+1(1)}+\theta_{2N(2)}+\theta_{2N+1(2)})/4$$ [Formula 46]

In this way, the data of amplitude and phase, which is obtained by performing transmission/reception four times in the related art, can be obtained by performing transmission/reception twice.

Effects of First Embodiment

In the first embodiment, the position detection device 10 performs arithmetic processing by dividing the sampling data into 128 sampling data which are 2Nth (even-number-th) sampling data and 128 sampling data which are (2N+1)th (odd-number-th) sampling data. Thereby, even when the number of times of transmission/reception between the pen 90 and the loop coil 121 is reduced to ½, it is possible to obtain the amplitude and the phase from data double the data of the related art within the same reception time as that of the related art, so that the reduction effect of external noise is the same as that of the related art. In summary, the number of times of transmission/reception to obtain the same reduction effect of external noise as that of the related art is reduced to ½.

In this way, it is possible to improve the speed of pen position detection by reducing the number of times of transmission/reception between the pen 90 and the loop coil 121 even when parallelization is not implemented. Therefore, it is possible to improve the speed of pen position detection without increasing the circuit area or increasing the current consumption.

Further, in the first embodiment, the transmission time of the position detection device 10 is not different from that of the related art, so that it is possible to transmit a sufficient signal to the pen 90. Therefore, the signal received by the pen 90 can have the same amplitude as that of the related art.

Thus, as the voltage detection amplifier of the pen 90, a voltage detection amplifier similar to that of the related art can be used.

Further, in the first embodiment, the reception time of the position detection device 10 is not different from that of the related art, so that the resolution of DFT is also not different from that of the related art. Therefore, it is possible to use the pen 90 which is used in the related art and which has a plurality of resonance frequencies. Thus, it is possible to realize the downward compatibility of the pen 90.

Further, in the first embodiment, the position detection device 10 increases the frequency of the sampling clock. When performing the position detection of the pen 90 from a state in which the position of the pen 90 is not detected at all (when sequentially scanning all the loop coils 121), in general, if increasing the frequency of the sampling clock, the current consumption of the circuit increases in proportion to the frequency. However, the pen position can be quickly detected according to the increased frequency, so that the current consumption until the pen position is detected does not increase.

Further, in the first embodiment, as the voltage detection amplifier 109 of the position detection device 10, the same voltage detection amplifier as that of the related art can be used. The current consumption does not affect the frequency of the sampling clock, and when the number of times of reception decreases simply, the current consumption until the pen position is detected becomes a half.

Modification of First Embodiment

The numerical values used in the first embodiment are an example. Further, for example, general formulas such as formulas (3) and (4) in Japanese Patent No. 2971488 can be used as the formulas to obtain a real part and an imaginary part.

If the performance and the cost are allowed, it is possible to reduce the number of times of transmission/reception to ⅓ or ¼ by increasing the speed of the sampling clock threefold or fourfold by increasing the numbers of adders, holding circuits, and amplitude/phase arithmetic circuits in the signal processing arithmetic circuit 111 to increase the number of parallel circuits. If it is difficult to increase the number of parallel circuits of adders and the like to be mounted, time sharing control may be performed by increasing a circuit operating speed.

Second Embodiment

Configuration of Second Embodiment

Figure 6:
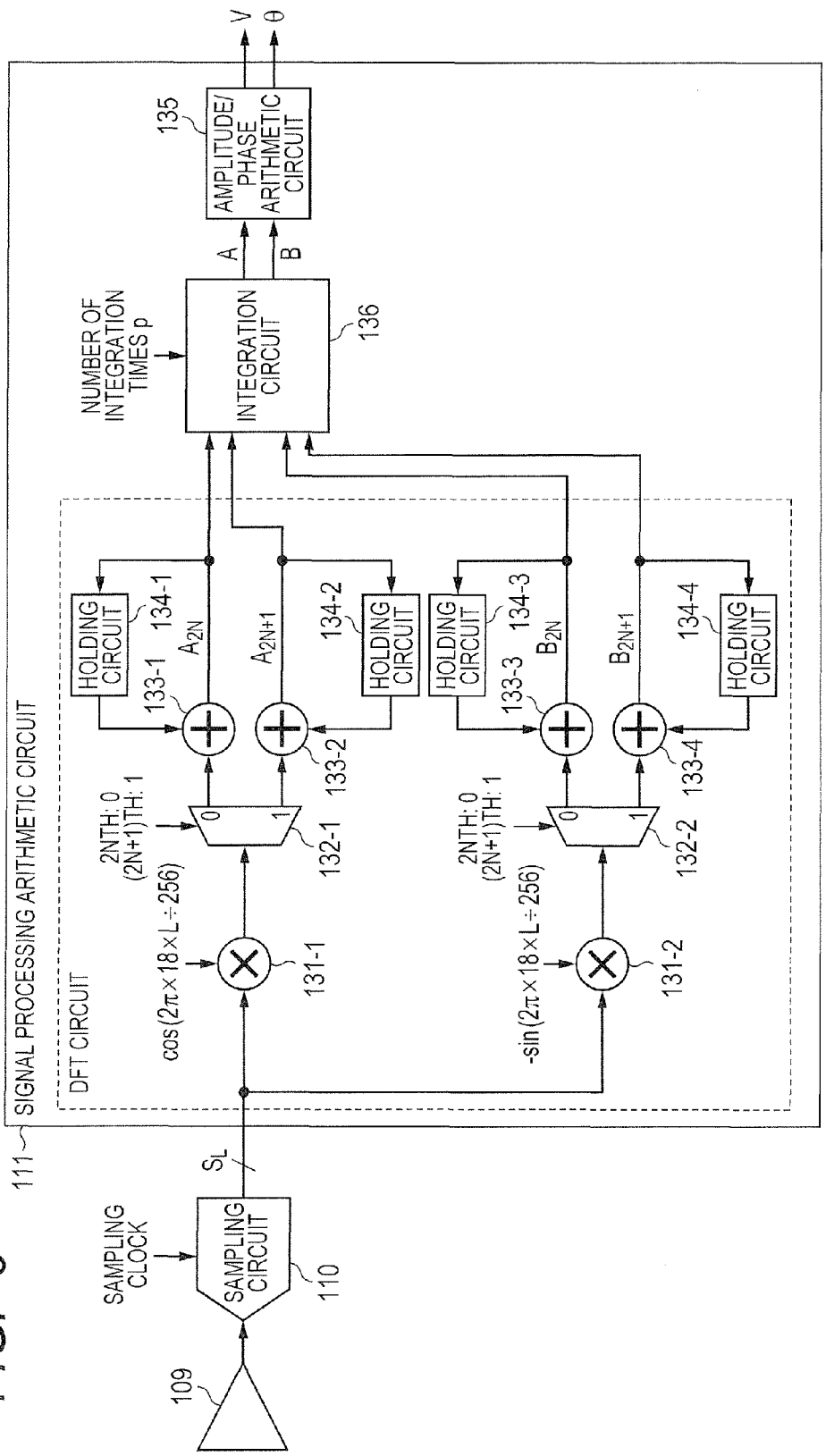
FIG. 6 is a diagram showing a configuration of a signal processing arithmetic circuit according to the second embodiment.

A configuration of the signal processing arithmetic circuit 111 of the second embodiment is different from that of the first embodiment. FIG. 6 shows an internal configuration of the signal processing arithmetic circuit 111 according to the second embodiment. In FIG. 6, numerical values such as frequencies are examples, and not limited to these values.

The signal processing arithmetic circuit 111 according to the second embodiment has substantially the same configuration as that of the first embodiment shown in FIG. 3. However, the signal processing arithmetic circuit 111 is different from that of the first embodiment in the following points.

First, the coefficients by which the multipliers 131-1 and 131-2 multiply the sampling data $S_L$ are different. Specifically, the multiplier 131-1 multiplies the sampling data $S_L$ by $\cos(2\pi \times 18 \times L \div 128)$. The multiplier 131-2 multiplies the sampling data $S_L$ by $-\sin(2\pi \times 18 \times L \div 128)$.

Second, the signal processing arithmetic circuit 111 is different in a point that the two amplitude/phase arithmetic circuits 135-1 and 135-2 are replaced by one amplitude/phase arithmetic circuit 135 and positions of the amplitude/phase arithmetic circuit 135 and the integration circuit 136 are switched. That is to say, when L becomes 255, only the 2Nth real part $A_{2N}$ and imaginary part $B_{2N}$ and only the (2N+1)th real part $A_{2N+1}$ and imaginary part $B_{2N+1}$ are outputted to the integration circuit 136. The integration circuit 136 integrates these parts, which are obtained from data that are received a plurality of times, for a number of times corresponding to the number of integration times p, and outputs a real part A and an imaginary part B which are the integration result to the amplitude/phase arithmetic circuit 135. The amplitude/phase arithmetic circuit 135 calculates the amplitude V and the phase θ based on the real part A and the imaginary part B.

Operation of Second Embodiment

Next, an operation of the second embodiment will be described. In the second embodiment, in the same manner as in the first embodiment, a sign wave reception signal of frequency f=500 [kHz] outputted from the voltage detection amplifier 109 is sampled by the sampling circuit 110 during a period of 32 [μsec] at a sampling frequency fs=8 [MHz] that is two times that of the related art. FIG. 5 shows a condition of the sampling.

As shown in FIG. 5, the number of sampling data obtained during a period of 32 [μsec] is 32 [μsec]/(⅛ [MHz])=256. The sampling data obtained at 0th time is $S_0$ and the sampling data obtained at 1st time is $S_1$. In the same manner, the sampling data obtained at 255th time is $S_{255}$. Arithmetic processing is performed by dividing the 256 sampling data into 128 sampling data which are 2Nth (even-number-th) sampling data and 128 sampling data which are (2N+1)th (odd-number-th) sampling data. This is the same as in the first embodiment.

In the 2Nth sampling data, a real part and an imaginary part of only a frequency component of f=500 [kHz] (k=18) are defined as $A_{2N}$ and $B_{2N}$, respectively. In the (2N+1)th sampling data, a real part and an imaginary part of only a frequency component of f=500 [kHz] (k=18) are defined as $A_{2N+1}$ and $B_{2N+1}$, respectively. Then, different from the first embodiment, $A_{2N}$, $B_{2N}$, $A_{2N+1}$, and $B_{2N+1}$ can also be represented by formulas described below respectively. M is an integer from 0 to 127 and M is [L/2].

$$A_{2N} = \sum_{M=0}^{127} S_{2M} \times \cos(2\pi \times 18 \times 2M \div 256) \quad \text{[Formula 47]}$$

$$B_{2N} = \sum_{M=0}^{127} S_{2M} \times -\sin(2\pi \times 18 \times 2M \div 256).$$

$$A_{2N+1} = \sum_{M=0}^{127} S_{2M+1} \times \cos(2\pi \times 18 \times (2M+1) \div 256).$$

$$B_{2N+1} = \sum_{M=0}^{127} S_{2M+1} \times -\sin(2\pi \times 18 \times (2M+1) \div 256).$$

The same calculations can be performed in the case of f=468.75 [kHz] (k=17) and in the case of f=531.25 [kHz] (k=19).

Regarding the phase, although a phase difference occurs between the 2Nth sampling data and the (2N+1)th sampling data in the first embodiment, no phase difference occurs in the second embodiment because DFT is performed on the 2Nth sampling data and the (2N+1)th sampling data by a coefficient matched to a sampling point.

Hereinafter, operations of the voltage detection amplifier 109, the sampling circuit 110, and the signal processing arithmetic circuit 111, which realize the above calculation, will be described. As a signal transmission/reception method between the loop coil and the pen 90 and a pen position detection method that uses amplitude and phase that are outputs of the signal processing arithmetic circuit 111, the same methods as those used in the related art are used. The operations of the adders 133-1 to 133-4 and the holding circuits 134-1 to 134-4 are the same as those in the first embodiment. A value "0" is inputted in the holding circuits 134-1 to 134-4 and L in an initial state.

First, sampling data $S_0$ is outputted from the sampling circuit 110. In the next stage multiplier 131-1, the following calculation is performed.

$$S_0 \times \cos(2\pi \times 18 \times 0 \div 256) \qquad \text{[Formula 48]}$$

On the other hand, in the multiplier 131-2, the following calculation is performed.

$$S_0 \times -\sin(2\pi \times 18 \times 0 \div 256) \qquad \text{[Formula 49]}$$

L is 0 and the sampling data is 2Nth (even-number-th) sampling data, so that the output 0 is selected in the output selector 132-1 and the output selector 132-2. Therefore, the adder 133-1 adds the output of the holding circuit 134-1 and the output of the output selector 132-1.

$$A_{2N} = 0 + S_0 \times \cos(2\pi \times 18 \times 0 \div 256) \qquad \text{[Formula 50]}$$

Similarly, the adder 133-3 adds the output of the holding circuit 134-3 and the output of the output selector 132-2.

$$B_{2N} = 0 + S_0 \times -\sin(2\pi \times 18 \times 0 \div 256) \qquad \text{[Formula 51]}$$

The output selector 132-1 does not select the output 1 ("0" is outputted from the output 1), so that the adder 133-2 adds the output of the holding circuit 134-2 and "0".

$$A_{2N+1} = 0 + 0 \qquad \text{[Formula 52]}$$

Similarly, the adder 133-4 adds the output of the holding circuit 134-4 and "0".

$$B_{2N+1} = 0 + 0 \qquad \text{[Formula 53]}$$

At a timing of the next sampling clock, L=L+1, that is, L=1, is established and sampling data $S_1$ is outputted from the sampling circuit 110. At the same timing, $A_{2N}$, $A_{2N+1}$, $B_{2N}$, and $B_{2N+1}$ are inputted into the holding circuits 134-1 to 134-4, respectively. In the next stage multiplier 131-1, the following calculation is performed.

$$S_1 \times \cos(2\pi \times 18 \times 1 \div 256) \qquad \text{[Formula 54]}$$

On the other hand, in the multiplier 131-2, the following calculation is performed.

$$S_1 \times -\sin(2\pi \times 18 \times 1 \div 256) \qquad \text{[Formula 55]}$$

L is 1 and the sampling data is (2N+1)th (odd-number-th) sampling data, so that the output 1 is selected in the output selector 132-1 and the output selector 132-2. Therefore, the adder 133-2 adds the output of the holding circuit 134-2 and the output of the output selector 132-1.

$$A_{2N+1} = 0 + S_1 \times \cos(2\pi \times 18 \times 1 \div 256) \qquad \text{[Formula 56]}$$

Similarly, the adder 133-4 adds the output of the holding circuit 134-4 and the output of the output selector 132-2.

$$B_{2N+1} = 0 + S_1 \times -\sin(2\pi \times 18 \times 1 \div 256) \qquad \text{[Formula 57]}$$

The output selector 132-1 does not select the output 0 ("0" is outputted from the output 0), so that the adder 133-1 adds the output of the holding circuit 134-1 and "0".

$$A_{2N} = S_0 \times \cos(2\pi \times 18 \times 0 \div 256) \qquad \text{[Formula 58]}$$

Similarly, the adder 133-3 adds the output of the holding circuit 134-3 and "0".

$$B_{2N} = S_0 \times -\sin(2\pi \times 18 \times 0 \div 256) \qquad \text{[Formula 59]}$$

At a timing of the next sampling clock, L=L+1, that is, L=2, is established and sampling data $S_2$ is outputted from the sampling circuit 110. At the same timing, $A_{2N}$, $A_{2N+1}$, $B_{2N}$, and $B_{2N+1}$ are inputted into the holding circuits 134-1 to 134-4, respectively. In the next stage multiplier 131-1, the following calculation is performed.

$$S_2 \times \cos(2\pi \times 18 \times 2 \div 256) \qquad \text{[Formula 60]}$$

On the other hand, in the multiplier 131-2, the following calculation is performed.

$$S_2 \times -\sin(2\pi \times 18 \times 2 \div 256) \qquad \text{[Formula 61]}$$

L is 2 and the sampling data is 2Nth (even-number-th) sampling data, so that the output 0 is selected in the output selector 132-1 and the output selector 132-2. Therefore, the adder 133-1 adds the output of the holding circuit 134-1 and the output of the output selector 132-1.

$$A_{2N} = S_0 \times \cos(2\pi \times 18 \times 0 \div 256) + S_2 \times \cos(2\pi \times 18 \times 2 \div 256) \qquad \text{[Formula 62]}$$

Similarly, the adder 133-3 adds the output of the holding circuit 134-3 and the output of the output selector 132-2.

$$B_{2N} = S_0 \times -\sin(2\pi \times 18 \times 0 \div 256) + S_2 \times -\sin(2\pi \times 18 \times 2 \div 256) \qquad \text{[Formula 63]}$$

The output selector 132-1 does not select the output 1 ("0" is outputted from the output 1), so that the adder 133-2 adds the output of the holding circuit 134-2 and "0".

$$A_{2N+1} = 0 + S_1 \times \cos(2\pi \times 18 \times 1 \div 256) \qquad \text{[Formula 64]}$$

Similarly, the adder 133-4 adds the output of the holding circuit 134-4 and "0".

$$B_{2N+1} = 0 + S_1 \times -\sin(2\pi \times 18 \times 1 \div 256) \qquad \text{[Formula 65]}$$

The above processing is repeated until L becomes 255. When L becomes 255 and the series of calculations are completed, the 2Nth real part $A_{2N}$ is represented as follows:

$$A_{2N} = S_0 \times \cos(2\pi \times 18 \times 0 \div 256) + S_2 \times \cos(2\pi \times 18 \times 2 \div 256) + \ldots + S_{252} \times \cos(2\pi \times 18 \times 252 \div 256) + S_{254} \times \cos(2\pi \times 18 \times 254 \div 256) \qquad \text{[Formula 66]}$$

The 2Nth imaginary part $B_{2N}$ is represented as follows:

$$B_{2N} = S_0 \times -\sin(2\pi \times 18 \times 0 \div 256) + S_2 \times -\sin(2\pi \times 18 \times 2 \div 256) + \ldots + S_{252} \times -\sin(2\pi \times 18 \times 252 \div 256) + S_{254} \times -\sin(2\pi \times 18 \times 254 \div 256) \qquad \text{[Formula 67]}$$

The (2N+1)th real part $A_{2N+1}$ is represented as follows:

$$A_{2N+1} = S_1 \times \cos(2\pi \times 18 \times 1 \div 256) + S_3 \times \cos(2\pi \times 18 \times 3 \div 256) + \ldots + S_{253} \times \cos(2\pi \times 18 \times 253 \div 256) + S_{255} \times \cos(2\pi \times 18 \times 255 \div 256) \qquad \text{[Formula 68]}$$

The (2N+1)th imaginary part $B_{2N+1}$ is represented as follows:

$$B_{2N+1} = S_1 \times -\sin(2\pi \times 18 \times 1 \div 256) + S_3 \times -\sin(2\pi \times 18 \times 3 \div 256) + \ldots + S_{253} \times -\sin(2\pi \times 18 \times 253 \div 256) + S_{255} \times -\sin(2\pi \times 18 \times 255 \div 256) \qquad \text{[Formula 69]}$$

Therefore, when M=[L/2] as described above, $A_{2N}$, $B_{2N}$, $A_{2N+1}$, and $B_{2N+1}$ are respectively represented by the following formulas.

$$A_{2N} = \sum_{M=0}^{127} S_{2M} \times \cos(2\pi \times 18 \times 2M \div 256) \quad \text{[Formula 70]}$$

$$B_{2N} = \sum_{M=0}^{127} S_{2M} \times -\sin(2\pi \times 18 \times 2M \div 256).$$

$$A_{2N+1} = \sum_{M=0}^{127} S_{2M+1} \times \cos(2\pi \times 18 \times (2M+1) \div 256)$$

$$B_{2N+1} = \sum_{M=0}^{127} S_{2M+1} \times -\sin(2\pi \times 18 \times (2M+1) \div 256).$$

The values of $A_{2N}$, $B_{2N}$, $A_{2N+1}$, and $B_{2N+1}$ are integrated by the next stage integration circuit 136. The number of times when the integration is performed by the integration circuit 136 can be set by the number of integration times p. In the case of p=1, A and B are respectively calculated as follows:

$$A = A_{2N} + A_{2N+1}$$

$$B = B_{2N} + B_{2N+1} \quad \text{[Formula 71]}$$

In this way, the data of the real part and the imaginary part, which is obtained by performing transmission/reception twice in the related art, can be obtained by one-time transmission/reception.

In the case of p=2, when the first time real parts and imaginary parts are defined as $A_{2N(1)}$, $A_{2N+1(1)}$, $B_{2N(1)}$, and $B_{2N+1(1)}$, and the second time real parts and imaginary parts are defined as $A_{2N(2)}$, $A_{2N+1(2)}$, $B_{2N(2)}$, and $B_{2N+1(2)}$, A and B are respectively calculated as follows:

$$A = A_{2N(1)} + A_{2N+1(1)} + A_{2N(2)} + A_{2N+1(2)}$$

$$B = B_{2N(1)} + B_{2N+1(1)} + B_{2N(2)} + B_{2N+1(2)} \quad \text{[Formula 72]}$$

In this way, the data of the real part and the imaginary part, which is obtained by performing transmission/reception four times in the related art, can be obtained by performing transmission/reception twice.

The amplitude V calculated by the amplitude/phase arithmetic circuit 135 using the values of A and B is as follows:

$$V = \frac{1}{128}\sqrt{A^2 + B^2}. \quad \text{[Formula 73]}$$

The phase θ is as follows:

$$\theta = \tan^{-1}\left(\frac{B}{A}\right) \quad \text{[Formula 74]}$$

In this way, although the amplitude and the phase are obtained by two calculations in the first embodiment, the amplitude and the phase are obtained by one calculation in the second embodiment.

Effects of Second Embodiment

In the second embodiment, different from the first embodiment, a phase difference does not appear between the 2Nth sampling data and the (2N+1)th sampling data, so that it is not necessary to correct the phase difference and the circuit can be simplified.

Further, in the second embodiment, the amplitude and the phase can be obtained by one calculation, so that it is possible to reduce circuit scale or shorten calculation time (calculations of square root and trigonometric function require a lot of calculation resources, so that the second embodiment is particularly effective for the calculations).

The other effects are the same as those of the first embodiment.

Third Embodiment

Configuration of Third Embodiment

Figure 7:
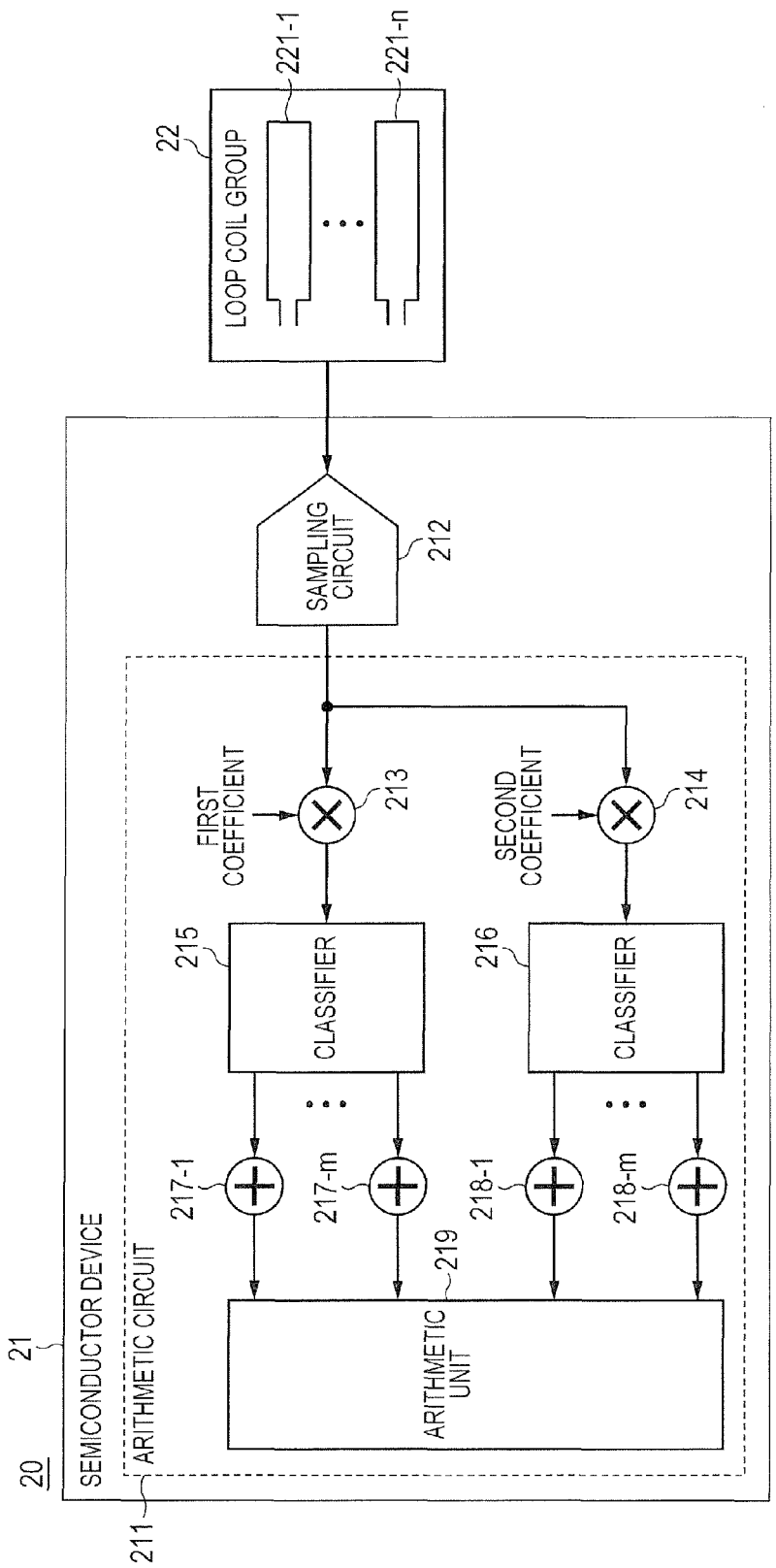
FIG. 7 is a diagram showing a configuration of a position detection device according to a third embodiment.

The third embodiment corresponds to an embodiment famed by extracting concepts of the first and the second embodiments described above. FIG. 7 shows a configuration of a position detection device 20 according to the third embodiment. The position detection device 20 detects a position indicated by a position indicator (not shown in the drawings) such as a pen. The position detection device 20 includes a semiconductor device 21 which is an IC or the like and a loop coil group 22. The loop coil group 22 includes n (n is an integer greater than or equal to 2) loop coils 221-1 to 221-n (hereinafter referred to as a loop coil 221 when not specifying a specific loop coil). The semiconductor device 21 includes an arithmetic circuit 211 and a sampling circuit 212.

The loop coils 221-1 to 221-n transmit and receive a signal to and from the position indicator by electromagnetic resonance. The loop coil group 22 corresponds to the loop coil group 12 of the first and the second embodiments and the loop coils 221-1 to 221-n correspond to the loop coils 121-1 to 121-n of the first and the second embodiments.

The sampling circuit 212 samples a reception signal received by one loop coil 221 selected from among the n loop coils 221-1 to 221-n and outputs sampling data to the arithmetic circuit 211. The sampling circuit 212 corresponds to the sampling circuit 110 of the first and the second embodiments.

The arithmetic circuit 211 performs arithmetic processing on the sampling data outputted from the sampling circuit 212. Specifically, the arithmetic circuit 211 first calculates the real part and the imaginary part of the sampling data. Specifically, the calculation is to calculate a real part and an imaginary part of a complex number that is an expression obtained when a time domain function of sampling data is converted into a frequency domain function (the same shall apply hereinafter). Subsequently, the arithmetic circuit 211 classifies the real part of the sampling data into one of m (m is an integer greater than or equal to 2) groups and classifies the imaginary part of the sampling data into one of m groups according to an order of output of the sampling data from the sampling circuit 212. Subsequently, the arithmetic circuit 211 adds together real parts of sampling data belonging to a group for each of the m groups and adds together imaginary parts of sampling data belonging to a group for each of m groups. Thereafter, the arithmetic circuit 211 calculates the amplitude and the phase of the reception signal by using an addition result of the real parts and an addition result of the imaginary parts of each of the m groups. The arithmetic circuit 211 corresponds to the signal processing arithmetic circuit 111 of the first and the second embodiments.

The arithmetic circuit 211 includes multipliers 213 and 214, classifiers 215 and 216, m adders 217-1 to 217-m, m adders 218-1 to 218-m (hereinafter referred to as an adder 217 or 218 when not specifying a specific adder), and an arithmetic unit 219.

The multiplier 213 calculates the real part of the sampling data by multiplying the sampling data outputted from the sampling circuit 212 by a first coefficient. The first coefficient is a cosine value according to a frequency component extracted from the reception signal and an output sequence from the sampling circuit 212 (k and L of the first and the second embodiment). The multiplier 213 corresponds to the multiplier 131-1 of the first and the second embodiment.

The multiplier 214 calculates the imaginary part of the sampling data by multiplying the sampling data outputted from the sampling circuit 212 by a second coefficient. The second coefficient is a sine value according to a frequency component extracted from the reception signal and an output sequence from the sampling circuit 212 (k and L of the first and the second embodiment). The multiplier 214 corresponds to the multiplier 131-2 of the first and the second embodiment.

The classifier 215 classifies the real part of the sampling data into one of m groups according to an order of output of the sampling data from the sampling circuit 212. The classifier 215 corresponds to the output selector 132-1 of the first and the second embodiments.

The classifier 216 classifies the imaginary part of the sampling data into one of m groups according to an order of output of the sampling data from the sampling circuit 212. The classifier 216 corresponds to the output selector 132-2 of the first and the second embodiments.

The m groups may be two groups including a 2Nth (even-number-th) group and a (2N+1)th (odd-number-th) group as in the first and the second embodiment. However, it is not limited to this. For example, the m groups may be three groups including a 3Nth group, a (3N+1)th group, and a (3N+2)th group, or may be four groups including a 4Nth group, a (4N+1)th group, a (4N+2)th group, and a (4N+3)th group.

The adders 217-1 to 217-$m$ are provided corresponding to m groups, respectively. The adders 217-1 to 217-$m$ adds together the real parts of sampling data belonging to a corresponding group. The adders 217-1 to 217-$m$ correspond to the adders 133-1 and 133-2 of the first and the second embodiments.

The adders 218-1 to 218-$m$ are provided corresponding to m groups, respectively. The adders 218-1 to 218-$m$ adds together the imaginary parts of sampling data belonging to a corresponding group. The adders 218-1 to 218-$m$ correspond to the adders 133-3 and 133-4 of the first and the second embodiments.

The arithmetic unit 219 calculates the amplitude and the phase of the reception signal by using an addition result of the real parts and an addition result of the imaginary parts of each of the m groups. The arithmetic unit 219 corresponds to the amplitude/phase arithmetic circuits 135-1 and 135-2 and the integration circuit 136 of the first embodiment. Alternatively, the arithmetic unit 219 corresponds to the integration circuit 136 and the amplitude/phase arithmetic circuit 135 of the second embodiment.

Operation of Third Embodiment

Next, an operation of the third embodiment will be described. FIG. 8 shows an operation flow of the position detection device 20 according to the third embodiment.

The sampling circuit 212 samples a reception signal received by one loop coil 221 in a predetermined interval for each predetermined interval for the loop coil 221 selected from among the n loop coils 221-1 to 221-$n$ and outputs sampling data to the arithmetic circuit 211 (step S1).

The multiplier 213 calculates the real part of the sampling data by multiplying the sampling data outputted from the sampling circuit 212 by a first coefficient. The multiplier 214 calculates the imaginary part of the sampling data by multiplying the sampling data outputted from the sampling circuit 212 by a second coefficient (step S2).

The classifier 215 classifies the real part of the sampling data into one of m groups according to an order of output of the sampling data from the sampling circuit 212. The classifier 216 classifies the imaginary part of the sampling data into one of m groups according to an order of output of the sampling data from the sampling circuit 212 (step S3).

The adders 217-1 to 217-$m$ add together the real parts of sampling data which belong to a corresponding group and which are sampled by the sampling circuit 212 in a predetermined interval for each predetermined interval (step S4).

The adders 218-1 to 218-$m$ add together the imaginary parts of sampling data which belong to a corresponding group and which are sampled by the sampling circuit 212 in a predetermined interval for each predetermined interval (step S5).

The arithmetic unit 219 calculates the amplitude and the phase of the reception signal by using an addition result of the real parts and an addition result of the imaginary parts of each of the m groups for each predetermined interval 1 (step S6).

Specifically, the arithmetic unit 219 includes m calculation circuits (that are not shown in the drawings and correspond to the amplitude/phase arithmetic circuits 135-1 and 135-2 of the first embodiment) respectively provided corresponding to the m groups and one integration circuit (that is not shown in the drawings and corresponds to the integration circuit 136 of the first embodiment). The m calculation circuits calculate the amplitude and the phase of the reception signal by using an addition result of real parts of sampling data belonging to a corresponding group which are added together by a corresponding adder 217 and an addition result of imaginary parts of sampling data belonging to a corresponding group which are added together by a corresponding adder 218 for each predetermined interval. At this time, as in the first embodiment, when the first coefficient of the multiplier 213 and the second coefficient of the multiplier 214 are the same between groups, the phase of the reception signal is corrected. The integration circuit integrates amplitudes of reception signals of m groups, which are respectively calculated by m calculation circuits, for a predetermined interval. Further, the integration circuit integrates phases of reception signals of m groups, which are respectively calculated by m calculation circuits, for a predetermined interval.

Alternatively, the arithmetic unit 219 includes one integration circuit (that is not shown in the drawings and corresponds to the integration circuit 136 of the second embodiment) and one calculation circuit (that is not shown in the drawings and corresponds to the amplitude/phase arithmetic circuit 135 of the second embodiment). The integration circuit integrates addition results of real parts of sampling data of each of m groups, which are respectively added together by the adders 217-1 to 217-$m$, for a predetermined number of predetermined intervals. Further, the integration circuit integrates addition results of imaginary parts of sampling data of each of m groups, which are respectively added together by the adders 218-1 to 218-$m$, for a predetermined number of predetermined intervals. The calculation circuit calculates the amplitude and the phase of the reception signal by using an integration result of the real parts and an integration result of the imaginary parts of the sampling data, which are integrated by the integration circuit.

Effects of Third Embodiment

In the third embodiment, the semiconductor device 21 classifies the sampling data into one of m groups and performs arithmetic processing for each group. Thereby, even when the number of times of transmission/reception between the position indicator and the loop coil 221 is reduced to 1/m, it is possible to obtain the amplitude and the phase from data m times the data of the related art within the same reception time as that of the related art, so that the reduction effect of external noise is the same as that of the related art. In summary, the number of times of transmission/reception to obtain the same reduction effect of external noise as that of the related art is reduced to 1/m.

In this way, it is possible to improve the speed of position detection of the position indicator by reducing the number of times of transmission/reception between the position indicator and the loop coil 221 even when parallelization is not implemented. Therefore, it is possible to improve the speed of position detection of the position indicator without increasing the circuit area or increasing the current consumption.

Modifications of First to Third Embodiments

While the invention made by the inventors has been specifically described based on the embodiments, it is needless to say that the invention is not limited to the embodiments that have been described, but can be variously changed without departing from the scope of the invention.

For example, in the above embodiments, the semiconductor device performs processing to obtain the addition result of real parts and the addition result of imaginary parts of sampling data by using a DFT circuit. However, it is not limited to this. The processing may be performed by a processor such as DSP (Digital Signal Processor) instead of the DFT circuit.

Further, in the above embodiments, the semiconductor device performs processing on a reception signal received by a loop coil. However, it is not limited to this. For example, the semiconductor device may process another signal such as a sensor signal detected by a sensor.

What is claimed is:

1. A semiconductor device comprising:
a sampling circuit that samples a signal and outputs sampling data; and
an arithmetic circuit that performs processing on the sampling data outputted from the sampling circuit,
wherein the arithmetic circuit
calculates a real part and an imaginary part of the sampling data,
classifies the real part of the sampling data into one of a plurality of groups and classifies the imaginary part of the sampling data into one of the groups according to an order of output of the sampling data from the sampling circuit,
adds together real parts of sampling data belonging to a group for each of the groups,
adds together imaginary parts of sampling data belonging to a group for each of the groups, and
calculates amplitude and phase of the signal by using an addition result of real parts and an addition result of imaginary parts of each of the groups.

2. The semiconductor device according to claim 1,
wherein the arithmetic circuit includes
a first multiplier that calculates the real part of the sampling data by multiplying the sampling data by a first coefficient,
a second multiplier that calculates the imaginary part of the sampling data by multiplying the sampling data by a second coefficient,
a first classifier that classifies the real part of the sampling data into one of the groups according to the order of output of the sampling data from the sampling circuit,
a second classifier that classifies the imaginary part of the sampling data into one of the groups according to the order of output of the sampling data from the sampling circuit,
a plurality of first adders which are respectively provided corresponding to the groups and which add together real parts of sampling data belonging to a corresponding group,
a plurality of second adders which are respectively provided corresponding to the groups and which add together imaginary parts of sampling data belonging to a corresponding group, and
an arithmetic unit that calculates amplitude and phase of the signal by using an addition result of real parts and an addition result of imaginary parts of each of the groups.

3. The semiconductor device according to claim 2,
wherein the sampling circuit samples the signal generated in a predetermined interval for each predetermined interval,
wherein the first adder adds together real parts of sampling data which are sampled in the predetermined interval and which belong to a corresponding group, and
wherein the second adder adds together imaginary parts of sampling data which are sampled in the predetermined interval and which belong to a corresponding group.

4. The semiconductor device according to claim 3,
wherein the arithmetic unit includes
a plurality of calculation circuits which are respectively provided corresponding to the groups and which calculate amplitude and phase of the signal by using an addition result of real parts and an addition result of imaginary parts of sampling data which are sampled in the predetermined interval for each predetermined interval and which belong to a corresponding group, and
an integration circuit that integrates amplitudes of the signals of the groups for a predetermined number of the predetermined intervals and integrates phases of the signals of the groups for a predetermined number of the predetermined intervals.

5. The semiconductor device according to claim 4,
wherein the calculation circuits correct the phase of the signal when the first and the second coefficients are the same between the groups.

6. The semiconductor device according to claim 4
wherein the number of integrations of the integration circuit can be arbitrarily set.

7. The semiconductor device according to claim 3,
wherein the arithmetic unit includes
an integration circuit that integrates addition results of real parts of the sampling data of each of the groups for a predetermined number of the predetermined intervals and integrates addition results of imaginary parts of the sampling data of each of the groups for a predetermined number of the predetermined intervals, and a calculation circuit that calculates amplitude and phase of the signal by using an integration result of real parts and an integration result of imaginary parts of the sampling data.

8. The semiconductor device according to claim 7 wherein the number of integrations of the integration circuit can be arbitrarily set.

9. The semiconductor device according to claim 2,
wherein the first coefficient is a cosine value according to a frequency component of the signal and the order of output of the sampling data from the sampling circuit, and wherein the second coefficient is a sine value according to a frequency component of the signal and the order of output of the sampling data from the sampling circuit.

10. The semiconductor device according to claim 2, wherein the first multiplier, the second multiplier, the first classifier, the second classifier, the first adders, and the second adders forma discrete Fourier transform circuit.

11. The semiconductor device according to claim 1, wherein the groups are two groups including a group of sampling data outputted at even-numbered times from the sampling circuit and a group of sampling data outputted at odd-numbered times from the sampling circuit.

12. A position detection device comprising:
a plurality of loop coils that transmit and receive a signal to and from a position indicator;

a sampling circuit that samples a reception signal received by one loop coil selected from among the loop coils and outputs sampling data; and an arithmetic circuit that performs processing on the sampling data outputted from the sampling circuit, wherein the arithmetic circuit
calculates a real part and an imaginary part of the sampling data,
classifies the real part of the sampling data into one of a plurality of groups and classifies the imaginary part of the sampling data into one of the groups according to an order of output of the sampling data from the sampling circuit,
adds together real parts of sampling data belonging to a group for each of the groups,
adds together imaginary parts of sampling data belonging to a group for each of the groups, and
calculates amplitude and phase of the reception signal by using an addition result of real parts and an addition result of imaginary parts of each of the groups.

13. A control method of a semiconductor device, the control method comprising:
a sampling step of sampling a signal and outputting sampling data; and
an arithmetic step of performing processing on the sampling data outputted in the sampling step,
wherein the arithmetic step including
calculating a real part and an imaginary part of the sampling data,
classifying the real part of the sampling data into one of a plurality of groups and classifies the imaginary part of the sampling data into one of the groups according to an order of output of the sampling data in the sampling step,
adding together real parts of sampling data belonging to a group for each of the groups,
adding together imaginary parts of sampling data belonging to a group for each of the groups, and
calculating amplitude and phase of the signal by using an addition result of real parts and an addition result of imaginary parts of each of the groups.

* * * * *